United States Patent
Lahnstein et al.

(10) Patent No.: US 11,644,243 B2
(45) Date of Patent: May 9, 2023

(54) REVERSIBLE FLOW EVAPORATOR SYSTEM

(71) Applicant: Hyfra Industriekuhlanlagen GmbH, Krunkel (DE)

(72) Inventors: Gerhard Lahnstein, Brohl-Luetzing (DE); Berthold Adomat, Grünberg (DE)

(73) Assignee: Hyfra Industriekuhlanlagen GmbH, Krunkel (DE)

( * ) Notice: Subject to any disclaimer, the term of this patent is extended or adjusted under 35 U.S.C. 154(b) by 66 days.

(21) Appl. No.: 17/520,827

(22) Filed: Nov. 8, 2021

(65) Prior Publication Data
US 2022/0057115 A1 Feb. 24, 2022

Related U.S. Application Data

(63) Continuation of application No. 16/378,884, filed on Apr. 9, 2019, now Pat. No. 11,226,139.

(51) Int. Cl.
| | |
|---|---|
| *F28D 1/02* | (2006.01) |
| *F25B 13/00* | (2006.01) |
| *F25B 41/20* | (2021.01) |

(52) U.S. Cl.
CPC ............ *F28D 1/0213* (2013.01); *F25B 13/00* (2013.01); *F25B 41/20* (2021.01); *F25B 2313/0292* (2013.01); *F25B 2313/031* (2013.01)

(58) Field of Classification Search
CPC ........ F28D 1/0213; F25B 41/20; F25B 13/00; F25B 2313/0292; F25B 2313/031
See application file for complete search history.

(56) References Cited

U.S. PATENT DOCUMENTS

| | | |
|---|---|---|
| 4,210,202 A | 7/1980 | Boyer et al. |
| 4,579,304 A | 4/1986 | Williams |
| 4,839,951 A | 6/1989 | Boula et al. |
| 4,966,230 A | 10/1990 | Hughes et al. |

(Continued)

FOREIGN PATENT DOCUMENTS

| | | |
|---|---|---|
| DE | 2638468 A1 | 3/1977 |
| DE | 3328311 A1 | 2/1985 |

(Continued)

OTHER PUBLICATIONS

U.S. Appl. No. 15/298,691, Adomat.
U.S. Appl. No. 15/298,720, Adomat.
U.S. Appl. No. 16/378,884, Lahnstein et al.

*Primary Examiner* — Schyler S Sanks
(74) *Attorney, Agent, or Firm* — Shackelford, Bowen, McKinley & Norton, LLP

(57) ABSTRACT

A reversible flow heat exchange system includes a heat exchanger system that includes a canister configured to receive a first fluid from a machine and a heat exchanger disposed within the canister. The reversible flow heat exchange system also includes a cooling system coupled to the heat exchanger and configured to circulate a second fluid between the heat exchanger system and the cooling system and a reversing valve coupled to the heat exchanger and configured to selectively direct a flow of the first fluid in a first direction through the canister and in a second direction through the canister that is opposite the first direction.

20 Claims, 5 Drawing Sheets

(56) References Cited

U.S. PATENT DOCUMENTS

| | | | |
|---|---|---|---|
| 6,126,079 A * | 10/2000 | Shoemaker | F01P 7/048 236/35 |
| 6,546,999 B1 | 4/2003 | Dienhart et al. | |
| 7,013,953 B2 | 3/2006 | Jung | |
| 7,267,160 B2 | 9/2007 | Shincho et al. | |
| 7,667,057 B2 | 2/2010 | Regiert et al. | |
| 7,779,898 B2 | 8/2010 | Morrison et al. | |
| 7,921,904 B2 | 4/2011 | Matter et al. | |
| 9,562,727 B2 | 2/2017 | Fujii et al. | |
| 10,132,538 B2 | 11/2018 | Fritz | |
| 2003/0000686 A1 | 1/2003 | Kester | |
| 2003/0066632 A1 | 4/2003 | Bishop et al. | |
| 2004/0261983 A1 | 12/2004 | Hu | |
| 2005/0056049 A1 | 3/2005 | Sanada | |
| 2005/0173102 A1 | 8/2005 | Jung | |
| 2005/0217831 A1 | 10/2005 | Manaka | |
| 2006/0102332 A1 | 5/2006 | Taras et al. | |
| 2009/0013676 A1 | 1/2009 | Capelle et al. | |
| 2009/0084131 A1 | 4/2009 | Reifel et al. | |
| 2009/0084532 A1 | 4/2009 | Agee | |
| 2009/0173102 A1 | 7/2009 | Ogasawara | |
| 2009/0173483 A1 | 7/2009 | Beamer et al. | |
| 2009/0277606 A1 | 11/2009 | Reiss, III et al. | |
| 2010/0263847 A1 | 10/2010 | Alahyari et al. | |
| 2011/0107512 A1 | 5/2011 | Gilbert | |
| 2011/0284185 A1 | 11/2011 | Cullen et al. | |
| 2012/0151950 A1 | 6/2012 | Jagusztyn | |
| 2012/0193080 A1 | 8/2012 | Rasmussen | |
| 2013/0068606 A1 | 3/2013 | Lahnstein | |
| 2013/0098591 A1 | 4/2013 | Taras et al. | |
| 2013/0213073 A1 | 8/2013 | Fritz et al. | |
| 2014/0090827 A1 | 4/2014 | Iguchi et al. | |
| 2014/0262188 A1 | 9/2014 | Sistla | |
| 2016/0010905 A1 | 1/2016 | Wang et al. | |
| 2016/0377348 A1 | 12/2016 | Fujisawa et al. | |
| 2017/0115066 A1 * | 4/2017 | Adomat | F28D 1/0213 |
| 2017/0254605 A1 * | 9/2017 | Blomgren | F28G 13/00 |
| 2018/0051945 A1 | 2/2018 | Hanov et al. | |

FOREIGN PATENT DOCUMENTS

| | | |
|---|---|---|
| DE | 19703729 C1 | 7/1998 |
| DE | 102006050922 A1 | 4/2008 |
| EP | 1607707 A1 | 12/2005 |
| EP | 3029407 A1 | 6/2016 |
| EP | 3159645 A1 | 4/2017 |
| FR | 2914407 A1 | 10/2008 |
| JP | S53106962 A | 9/1978 |
| WO | WO-2010011452 A2 | 1/2010 |
| WO | WO-2011115626 A1 | 9/2011 |
| WO | WO-2016009565 A1 | 1/2016 |

* cited by examiner

REVERSIBLE FLOW EVAPORATOR SYSTEM

CROSS-REFERENCE TO RELATED APPLICATIONS

This application is a continuation of U.S. patent application Ser. No. 16/378,884, filed on Apr. 9, 2019. U.S. patent application Ser. No. 16/378,884 is incorporated herein by reference.

TECHNICAL FIELD

The present invention relates generally to a heat exchange system and more particularly, but not by way of limitation, to a system and method for reversing a flow of a fluid through the heat exchange system.

BACKGROUND

Machines often make use of a circulating fluid (e.g., oil) to provide lubrication and/or cooling. As the fluid circulates through the machine, heat is dissipated. The dissipation of heat from the machine may be improved by circulating the fluid from the machine to an external cooling apparatus, such as a heat exchanger. Examples of such machines include lathes, CNC machines, mills, and other machines that use a cutting tool to shape metallic objects. As the cutting tool removes metal via cutting or abrasion, heat is generated as a result of the work that is done to the metallic object by the cutting tool. The heat generated can damage the cutting tool, the machine, and/or the metallic object being worked on. In order to remove this generated heat, a fluid can be circulated around the cutting tool and the metallic object to absorb heat. Removal of heat from the machine can be improved by circulating the fluid through a cooling system.

While using a cooling system can be beneficial, the external cooling system can become clogged by debris that collects within the fluid as a result of the cutting/abrasion process. For example, the debris can include metal shavings, cuttings, particles, dust, sludge, and the like. The debris may include other particulate matter that the fluid is exposed to during operation of the machine. As the machine and cooling system operate, elements of the cooling system (e.g., an evaporator) can collect debris. As debris builds, efficiency of the cooling system declines. Eventually, it becomes necessary to cease operation of the cooling system so that maintenance and cleaning can take place.

BRIEF SUMMARY OF THE INVENTION

An illustrative reversible flow heat exchange system includes a heat exchanger system that includes a canister configured to receive a first fluid from a machine and a heat exchanger disposed within the canister. The reversible flow heat exchange system also includes a cooling system coupled to the heat exchanger and configured to circulate a second fluid between the heat exchanger system and the cooling system and a reversing valve coupled to the heat exchanger and configured to selectively direct a flow of the first fluid in a first direction through the canister and in a second direction through the canister that is opposite the first direction.

An illustrative method of controlling a direction of fluid flow through a heat exchanger system includes circulating a first fluid between a machine and a heat exchanger system, circulating a second fluid between the heat exchanger system and a cooling system, directing a flow of the first fluid through the heat exchanger system in a first direction by orienting a reversing valve in a first orientation and directing the flow of the first fluid through the heat exchanger system in a second direction by orienting the reversing valve in a second orientation, and exchanging, via a heat exchanger of the heat exchanger system, heat between the first fluid and the second fluid. The method further includes wherein a direction of flow of the first fluid through the machine remains the same when the first fluid flows through the heat exchanger system in the first or the second directions.

An illustrative reversible flow heat exchange system includes a heat exchanger system that includes a canister configured to receive a first fluid from a machine and a heat exchanger disposed within the canister. The reversible flow heat exchange system also includes a cooling system coupled to the heat exchanger system and configured to circulate a second fluid between the heat exchanger system and the cooling system, a reversing valve coupled to the heat exchanger and configured to selectively direct a flow of the first fluid in a first direction through the canister and in a second direction through the canister, an actuator coupled to the reversing valve and configured to control an orientation of the reversing valve, a controller configured to operate the actuator and a sensor coupled to the controller and positioned to monitor build up of particulate matter on the heat exchanger.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
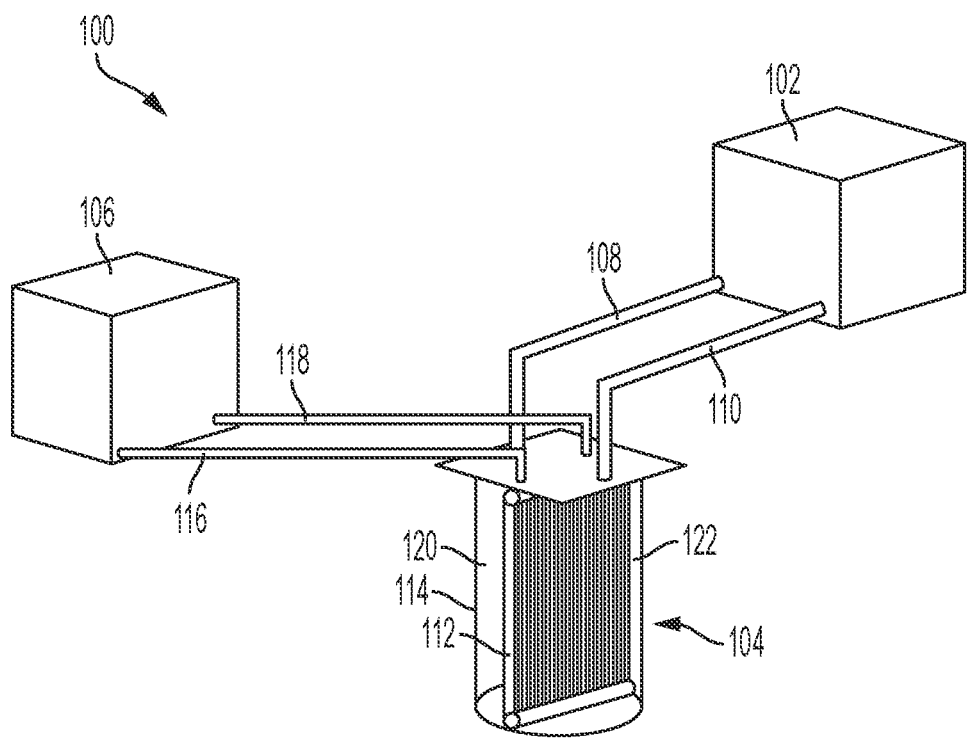
FIG. 1 illustrates a prior art heat exchange system.

FIG. 1 illustrates a prior art heat exchange system 100. System 100 includes a machine 102, a heat exchanger system 104, and a cooling system 106 and provides cooling for machine 102 by circulating a first fluid between machine 102 and heat exchanger system 104 via fluid lines 108, 110. The first fluid flows from machine 102 to heat exchanger system 104 via fluid line 108 and returns to machine 102 via fluid line 110. The first fluid absorbs heat from machine 102 and then transfers the absorbed heat to a second fluid via a heat exchanger 112 within a canister 114 of heat exchanger system 104. The second fluid circulates between heat exchanger system 104 and cooling system 106 via fluid lines 116, 118. Heat is removed from the second fluid by cooling system 106. Cooling system 106 can cool the second fluid in a variety of ways. In some aspects, cooling system 106 includes traditional air conditioning components, such as a compressor and a condenser, with heat exchanger 112 being used like an evaporator to cool the first fluid. In other aspects, cooling system 106 can cool the second fluid using other known cooling methods.

System 100 can be effective for removing heat from machine 102. However, the ability of system 100 to remove heat from the first fluid can decline over time due to buildup of particulate matter on heat exchanger 112. Particulate matter becomes entrained in the first fluid as the first fluid passes through machine 102 and is carried with the first fluid to heat exchanger system 104. The particulate matter may be, for example, metal shavings, cuttings, particles, dust, sludge, and the like that results from operation of machine 102. The first fluid enters heat exchanger system 104 and is introduced to a first side 120 of canister 114. The first fluid then flows around heat exchanger 112 (i.e., through gaps 136, see FIG. 3) to a second side 122 of canister 114. As the first fluid flows around heat exchanger 112, some of the particulate matter within the first fluid is deposited upon surfaces of heat exchanger 112. As more and more particulate matter is deposited upon heat exchanger 112, the efficiency of heat transfer between the first fluid and the second fluid decreases. In some instances, flow of the first fluid through heat exchanger system 104 is reduced or even blocked.

The build up of particulate matter on heat exchanger 112 can be delayed somewhat by filtering the first fluid before the first fluid enters heat exchanger system 104. However, use of a simple filter only slows the buildup of particulate matter and does not prevent it entirely. Eventually, it becomes necessary to cease operation of heat exchanger system 104 to perform maintenance. Maintenance requires disassembly of heat exchanger system 104 so that heat exchanger 112 can be cleaned. Cleaning heat exchanger 112 is time consuming as numerous fluid connections (e.g., fluid lines 108, 110, 116, 118) to heat exchanger system 104 must be disconnected. In some aspects, the second fluid may be a refrigerant under pressure, which makes connecting and disconnecting heat exchanger 112 more difficult. Using more complex filtering systems may remove more particulate matter from the first fluid, but more complex filtering systems are undesirable as their use adds complexity and cost to system 100.

Figure 2A:
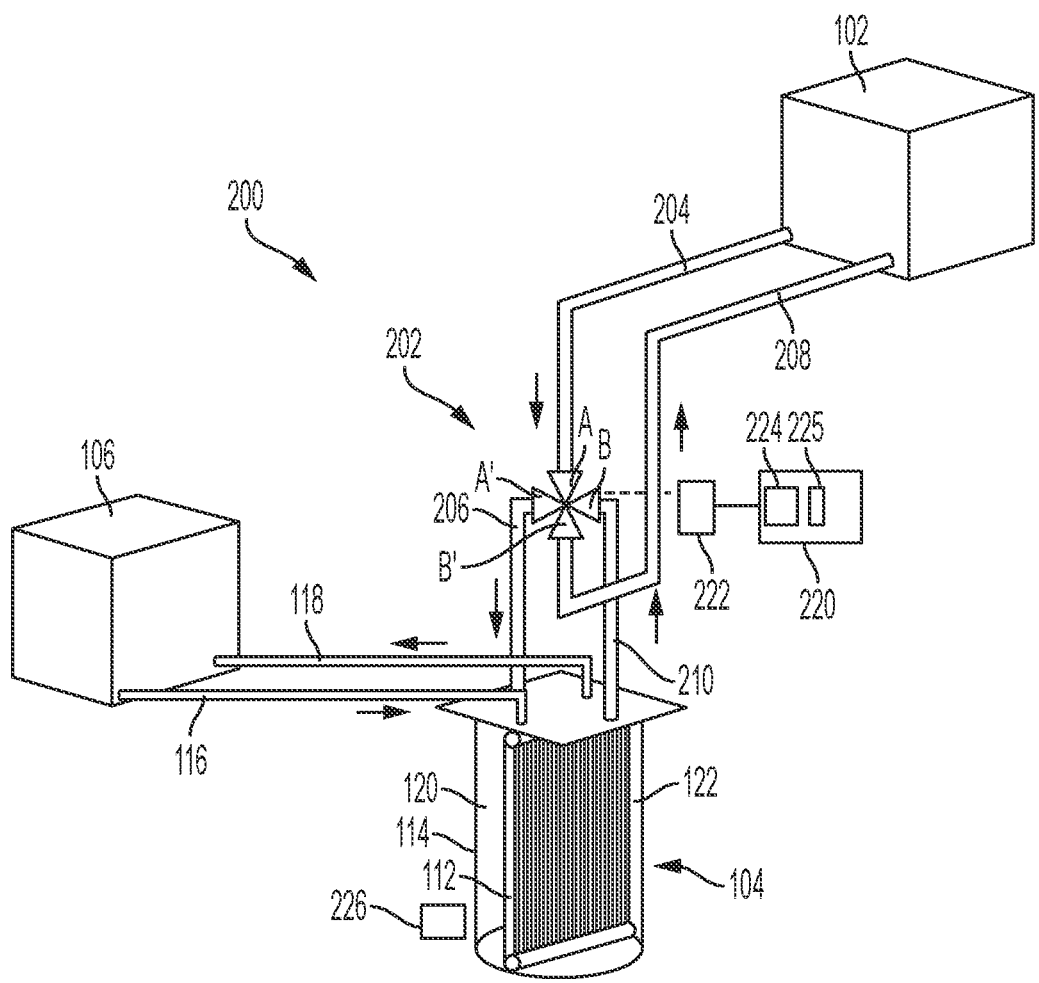
FIGS. 2A and 2B illustrate a reversible flow heat exchange system according to aspects of the disclosure.
Figure 2B:
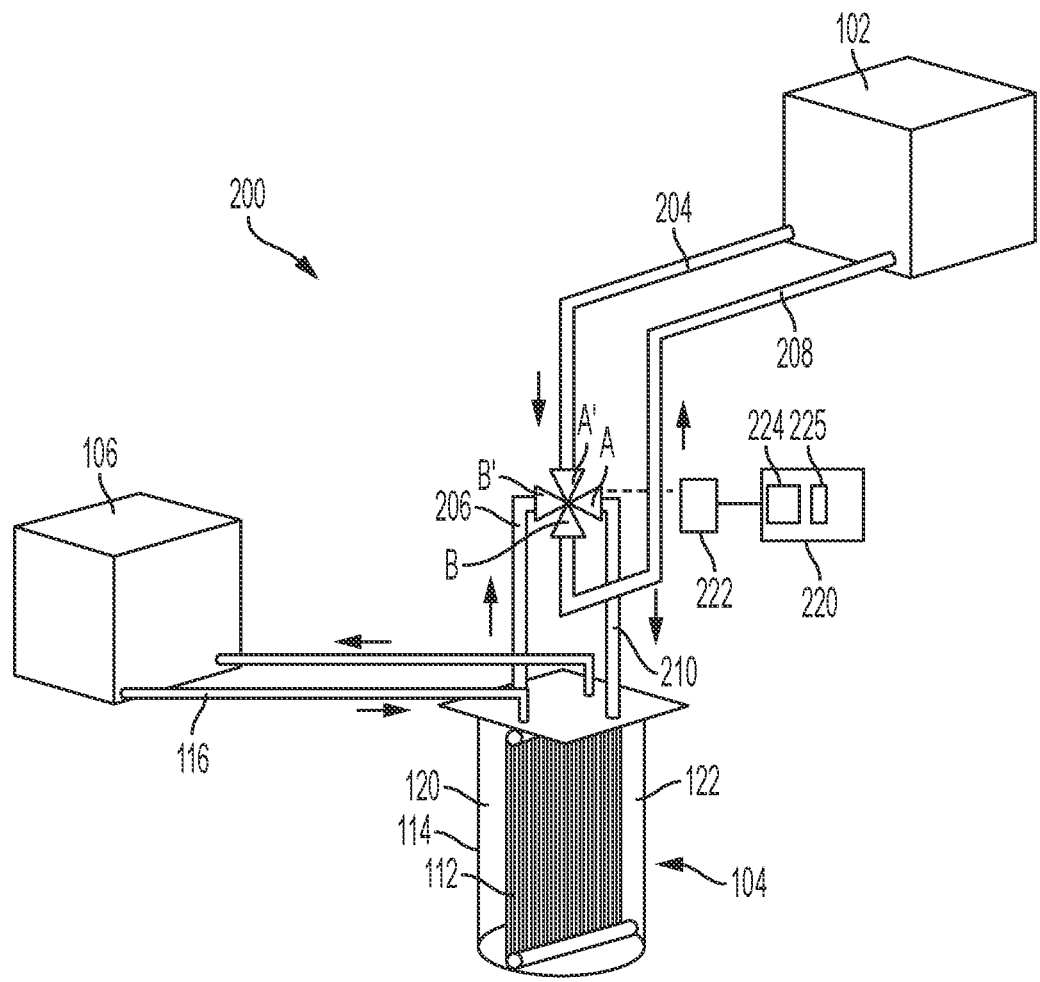

Referring now to FIGS. 2A and 2B, a reversible flow heat exchange system 200 is illustrated. Reversible flow heat exchange system 200 includes some of the same components of system 100 of FIG. 1. Components that remain the same in FIG. 2 have the same part number as shown in FIG. 1. A primary difference between reversible flow heat exchange system 200 and system 100 is the inclusion of a reversing valve 202 that includes a first pair of openings A-A' and a second pair of openings B-B'. Each pair of valve openings are coupled together so that the first fluid flows from one valve opening of the pair of valve openings to the other valve opening of the pair of valve openings. For example, fluid that enters a first valve opening A flows through reversing valve 202 and exits reversing valve 202 through a second valve opening A'. Relative to FIG. 1, reversing valve 202 is placed in-line between fluid lines 108, 110 and allows the direction of flow of the first fluid around heat exchanger 112 to be reversed. As illustrated in FIGS. 2A and 2B, system 100 may be modified so that fluid line 108 is split into fluid lines 204 and 206 and fluid line 110 is split into fluid lines 208 and 210. In other aspects, fluid lines 108, 110 may be removed and new fluid lines 204-210 can be installed in their place. Fluid line 204 directs the first fluid out of machine 102 and fluid line 208 directs the first fluid into machine 102.

With reversing valve 202 oriented as shown in FIG. 2A (i.e., the first pair of valve openings A-A' are connected to fluid lines 204, 206, respectively, and the second pair of valve openings B-B' are connected to fluid lines 210, 208, respectively), the first fluid flows from first side 120 to second side 122 (i.e., in the same direction as shown in FIG. 1). Rotating reversing valve 202 90° to the right results in the orientation of reversing valve 202 as shown in FIG. 2B (i.e., the first pair of valve openings A-A' are connected to fluid lines 210, 204, respectively, and the second pair of valve openings B-B' are connected to fluid lines 208, 206, respectively). With reversing valve 202 oriented as shown in FIG. 2B, the first fluid flows from second side 122 to first side 120 (i.e., in a direction opposite to that shown in FIG. 1). It is noted that regardless of the configuration of reversing valve 202, the first fluid flows through machine 102 in the same direction.

Figure 3:
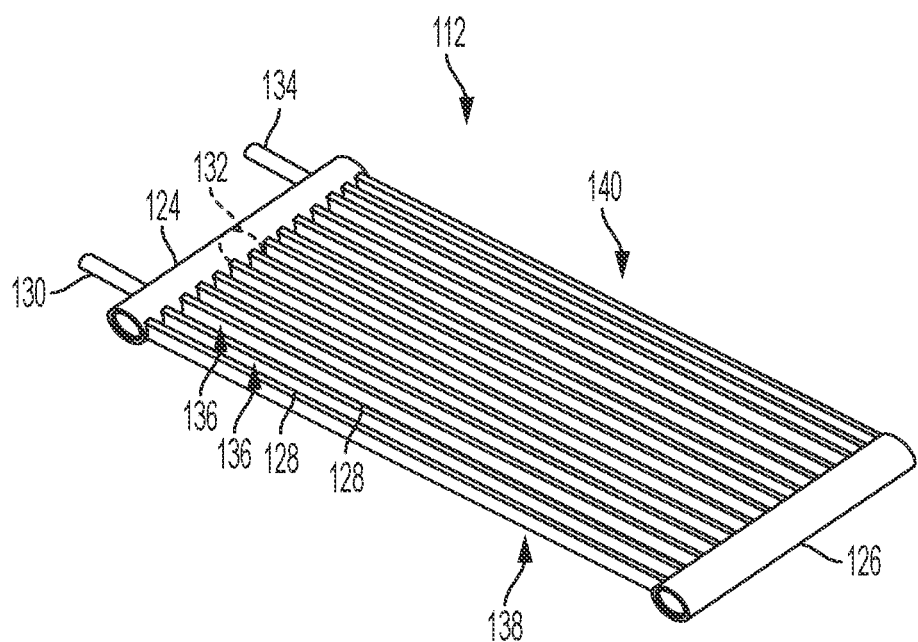
FIG. 3 illustrates a heat exchanger for use with the reversible flow heat exchange system of FIGS. 2A and 2B according to aspects of the disclosure.

FIG. 3 is a perspective view of heat exchanger 112. FIG. 3 is discussed relative to FIGS. 2A-2B. Heat exchanger 112 is a microchannel heat exchanger that includes a first end tank 124 and a second end tank 126 that are joined together by a plurality of microchannels 128. During operation of reversible flow heat exchange system 200, the second fluid enters heat exchanger 112 via an inlet 130 coupled to first end tank 124. First end tank 124 is divided into two sections by a baffle 132. The second fluid is distributed by first end tank 124 into a first set of microchannels of the plurality of microchannels 128. The second fluid next enters second end tank 126 and is directed back to first end tank 124 by a second set of microchannels of the plurality of microchannels 128. The second fluid then exits heat exchanger 112 via an outlet 134.

As illustrated in FIG. 3, each microchannel 128 is a tube with a rectangular cross-section through which the second fluid can flow. The plurality of microchannels 128 may have other cross-sections (e.g., round). As the second fluid passes through the plurality of microchannels 128, the second fluid absorbs heat from the first fluid that flows around the plurality of microchannels 128 through gaps 136. As the first fluid continues to flow around heat exchanger 112, particulate matter collects on a first side 138 of heat exchanger 112. In order to limit build up of particulate matter on first side 138, a direction of flow of the first fluid through canister 114 can be reversed using reversing valve 202. Flow of the first fluid is reversed by changing the orientation of reversing valve 202 from the configuration shown in FIG. 2A to the configuration shown in FIG. 2B.

Reversible flow heat exchange system 200 provides several benefits over system 100. For example, reversing the flow of the first fluid through canister 114 flushes particulate matter from gaps 136 and from first side 138, improving efficiency of heat exchanger 112. The direction of flow of the first fluid can be reversed in a periodic fashion to increase the time between servicing. For example, the first fluid can be passed through canister 114 with reversing valve 202 oriented as shown in FIG. 2A for a first time interval. At the end of the first time interval, reversing valve 202 is adjusted to the orientation shown in FIG. 2B and the first fluid is passed through canister 114 in the reverse direction for a second time interval. This process can be repeated to reduce the build up of particulate matter upon heat exchanger 112. The first and second time intervals can be varied as desired. For example, the first and second time intervals can be hourly, daily, weekly, monthly, etc. The first and second time intervals can be the same time interval or different time intervals. In some aspects, the first and second time intervals depend upon the type of first fluid used, the type of machine 102, the characteristics of the particulate matter, and the like.

Orientation of reversing valve 202 can be done manually or can be automated. Automation of reversing valve 202 can be implemented with a controller 220 and an actuator 222. Controller 220 can include a CPU 224 and memory 225 and is configured to control reversing valve 202. For example, controller 220 can be configured with a timer to set the first and second time intervals. Actuator 222 is communicatively coupled (e.g., wired or wireless connection) with controller 220 and can comprise various types of actuators, including servos and the like.

Automation of the orientation of reversing valve 202 can also include a sensor 226 that is communicatively coupled (e.g., wired or wireless connection) to controller 220 and detects an amount of particulate matter that has settled on heat exchanger 112. Responsive to a determination that a threshold amount of particulate matter has formed, controller 220 reverses flow of the first fluid through canister 114 with reversing valve 202. Sensor 226 can be an optical sensor or a resistivity sensor.

An additional benefit of the reversible design disclosed herein is that, when heat exchanger 112 is a microchannel heat exchanger, the performance of heat exchanger system 104 is not affected when the flow direction of the first fluid is reversed. Compared to other heat exchange systems, cooling performance of reversible flow heat exchange system 200 is maintained regardless of the direction of the flow of the first fluid through canister 114. For example, if a counter-flow heat exchanger where used instead of heat exchanger system 104, reversing the flow of the first fluid would result in a reduction of cooling efficiency due to the change from counter-flow of the first fluid relative to the second fluid to parallel-flow of the first fluid relative to the second fluid. Furthermore, the direction of flow of the first fluid through machine 102 remains constant, which allows operation of machine 102 to be maintained without any operational or structural changes. Maintaining the performance of heat exchanger 112 is also important when the second fluid is a refrigerant. This is important because it allows the refrigerant to be maintained in a superheat condition regardless of flow direction of the first fluid. If a different type of heat exchanger other than a microchannel heat exchanger were used, the performance of the heat exchanger would change when the direction of the flow of the first fluid is changed. Changing the performance of the heat exchanger would likely result in the refrigerant dropping out of superheat conditions, which would result in a combination of liquid refrigerant and vaporized refrigerant that could damage a compressor of cooling system 106.

Figure 4:
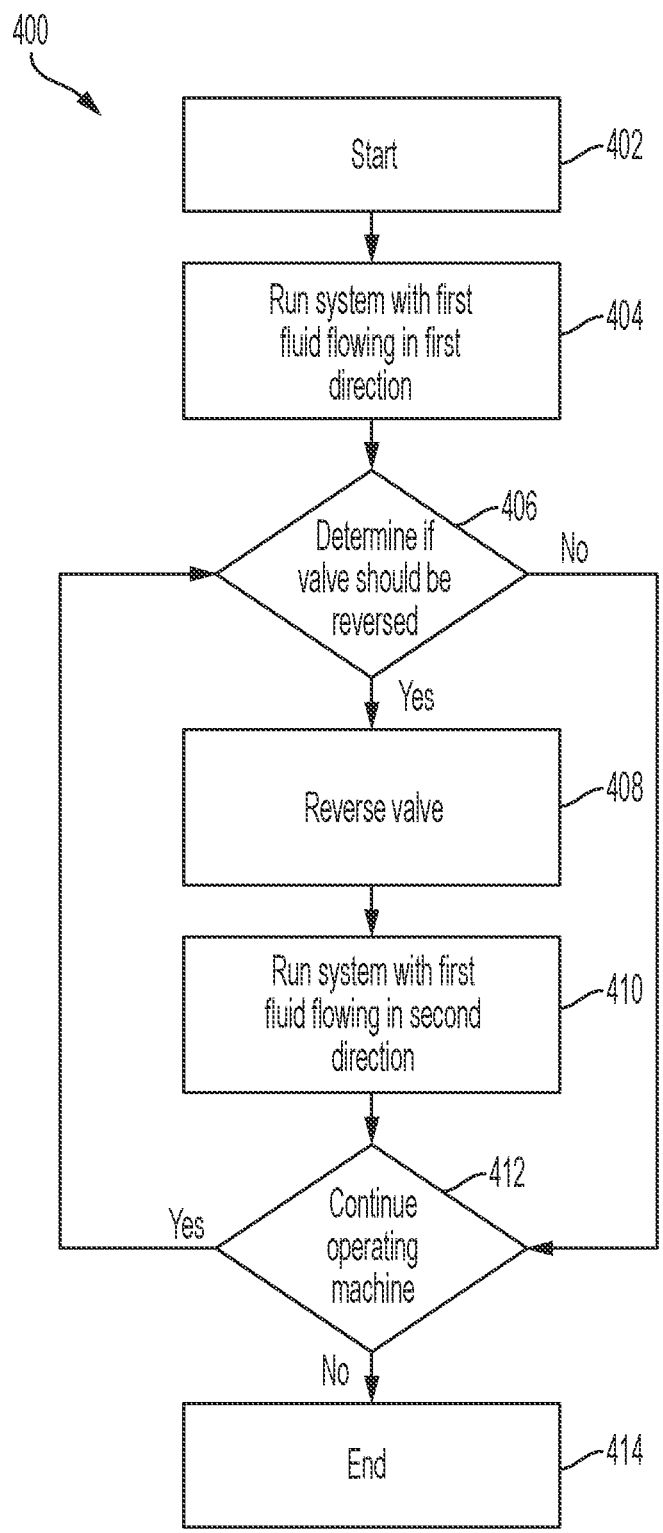
FIG. 4 is a flowchart illustrating a method of using a reversing valve in accordance with aspects of the disclosure.

FIG. 4 is a flowchart illustrating a method 400 of using reversing valve 202 in accordance with aspects of the disclosure. FIG. 4 is discussed relative to FIGS. 2A-3 above. Method 400 begins at step 402. At step 404, machine 102 of reversible flow heat exchange system 200 begins operating. During step 404, reversing valve 202 is oriented as illustrated in FIG. 2A and the first fluid flows from first side 120 of heat exchanger 112 to second side 122 of heat exchanger 112. Method 400 then proceeds to step 406.

At step 406, a determination is made as to whether or not reversing valve 202 should be reversed. The determination may be made by an operator (e.g., a human) of reversible flow heat exchange system 200 or by controller 220. As discussed above, the decision to reverse the orientation of reversing valve 202 may be made based upon various considerations. For example, the decision may be based upon an amount of time machine 102 has been operating or an amount of debris or buildup that has settled on first side 120 of heat exchanger 112 (e.g., by visual inspection by the operator or as detected by sensor 226). If a determination is made that reversing valve 202 does not need to be reversed, method 400 proceeds to step 412 and reversible flow heat exchange system 200 continues operation. If a determination is made that reversing valve 202 should be reversed, method 400 proceeds to step 408.

At step 408, the orientation of reversing valve 202 is changed to the position shown in FIG. 2B and the first fluid flows from second side 122 of heat exchanger 112 to first side 120 of heat exchanger 112. In some embodiments, the orientation of reversing valve 202 may be changed manually by the operator. In some embodiments the orientation of reversing valve 202 may be changed by controller 220. For example, controller 220 may send a signal to actuator 222 to reorient reversing valve 202. Method 400 then proceeds to step 410.

At step 410, machine 102 continues operating and the first fluid flows through canister 114 in a direction opposite to the direction of flow in step 404. Method 400 then proceeds to step 412. At step 412, a determination is made as to whether or not machine 102 should continue to operate. The determination may be made by the operator or controller 220. If a determination is made to continue operation of machine 102, method 400 returns to step 406. If a determination is made to cease operation of machine 102, method 400 proceeds to step 414 and method 400 ends.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms) Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A reversible flow heat exchange system, the reversible flow heat exchange system comprising:
   a heat exchanger system comprising:
      a canister configured to receive a first fluid from a machine; and
      a heat exchanger disposed within the canister;
   a cooling system coupled to the heat exchanger and configured to circulate a second fluid between the heat exchanger system and the cooling system;
   a reversing valve positioned in-line between a plurality of fluid lines and coupled to the heat exchanger and configured to direct a flow of the first fluid in a first direction through the canister, wherein rotating the reversing valve 90° to the right directs the flow of the first fluid in a second direction through the canister that is opposite the first direction; and
   wherein the first fluid flows in the first direction for a first time interval and flows in the second direction for a second time interval, wherein the first and second time intervals depend upon a type of the first fluid used in the reversible flow heat exchange system.

2. The reversible flow heat exchange system of claim 1, wherein the reversing valve comprises a first pair of valve openings and a second pair of valve openings, each pair of valve openings is coupled together such that the first fluid flows from one opening of the pair of valve openings to another opening of the pair of valve openings.

3. The reversible flow heat exchange system of claim 2, wherein the first pair of valve openings comprises a first opening and a second opening and the second pair of valve openings comprises a third opening and a fourth opening.

4. The reversible flow heat exchange system of claim 1, wherein the first time interval is different from the second time interval.

5. The reversible flow heat exchange system of claim 1, wherein, when the reversing valve is configured to direct the first fluid in the first direction, a fluid outlet of the machine is coupled to the first pair of valve openings and a fluid inlet of the machine is coupled to the second pair of valve openings.

6. The reversible flow heat exchange system of claim 1, wherein, when the reversing valve is configured to direct the first fluid in the second direction, a fluid outlet of the machine is coupled to the second pair of valve openings and a fluid inlet of the machine is coupled to the first pair of valve openings.

7. The reversible flow heat exchange system of claim 1, wherein the reversing valve is configured so that a direction of flow of the first fluid through the machine does not change when the first fluid flows in either the first direction or the second direction through the canister.

8. The reversible flow heat exchange system of claim 1, further comprising:
   an actuator coupled to the reversing valve and configured to direct the first fluid to flow in the first or second directions through the canister;
   a controller coupled to the actuator; and
   wherein the controller is configured to automatically actuate the reversing valve after a predetermined time interval.

9. The reversible flow heat exchange system of claim 1, wherein the second fluid comprises a refrigerant.

10. A method of controlling a direction of fluid flow through a heat exchanger system, the method comprising:
    circulating a first fluid between a machine and the heat exchanger system;
    circulating a second fluid between the heat exchanger system and a cooling system;
    directing a flow of the first fluid through the heat exchanger system in a first direction by orienting a reversing valve in a first orientation and directing the flow of the first fluid through the heat exchanger system in a second direction by rotating the reversing valve 90° to the right;
    exchanging, via a heat exchanger of the heat exchanger system, heat between the first fluid and the second fluid;
    wherein a direction of flow of the first fluid through the machine remains the same when the first fluid flows through the heat exchanger system in the first or the second directions; and
    wherein the first fluid flows in the first direction for a first time interval and flows in the second direction for a second time interval, wherein the first and second time intervals depend upon a type of the first fluid used in the heat exchanger system.

11. The method of claim 10, wherein the reversing valve comprises a first pair of valve openings and a second pair of valve openings, each pair of valve openings is coupled together such that the first fluid flows from one opening of the pair of valve openings to another opening of the pair of valve openings.

12. The method of claim 11, wherein the first pair of valve openings comprises a first opening and a second opening and the second pair of valve openings comprises a third opening and a fourth opening.

13. The method of claim 10, wherein the first time interval is different from the second time interval.

14. The method of claim 11, wherein the heat exchanger system comprises a controller configured to operate an actuator coupled to the reversing valve and orienting the reversing valve comprises actuating the actuator via the controller.

15. The method of claim 14, further comprising a sensor coupled to the controller and positioned to monitor build up of particulate matter on the heat exchanger.

16. The method of claim 15, wherein the controller is configured to automatically actuate the reversing valve responsive to the controller detecting build up of particulate matter.

17. A reversible flow heat exchange system, the reversible flow heat exchange system comprising:
- a heat exchanger system comprising:
  - a canister configured to receive a first fluid from a machine; and
  - a heat exchanger disposed within the canister;
- a cooling system coupled to the heat exchanger system and configured to circulate a second fluid between the heat exchanger system and the cooling system;
- a reversing valve positioned in-line between a plurality of fluid lines and coupled to the heat exchanger and configured to direct a flow of the first fluid in a first direction through the canister, wherein rotating the reversing valve 90° to the right directs the flow of the first fluid in a second direction through the canister that is opposite the first direction;
- wherein the first fluid flows in the first direction for a first time interval and flows in the second direction for a second time interval, wherein the first and second time intervals depend upon a type of the first fluid used in the reversible flow heat exchange system;
- an actuator coupled to the reversing valve and configured to control an orientation of the reversing valve;
- a controller configured to operate the actuator; and
- a sensor coupled to the controller and positioned to monitor build up of particulate matter on the heat exchanger.

18. The reversible flow heat exchange system of claim 17, wherein the reversing valve comprises a first pair of valve openings and a second pair of valve openings, each pair of valve openings is coupled together such that the first fluid flows from one opening of the pair of valve openings to another opening of the pair of valve openings.

19. The reversible flow heat exchange system of claim 18, wherein the first pair of valve openings comprises a first opening and a second opening and the second pair of valve openings comprises a third opening and a fourth opening.

20. The reversible flow heat exchange system of claim 17, wherein the first time interval is different from the second time interval.

* * * * *